United States Patent Office 3,522,063
Patented July 28, 1970

3,522,063
PHOSPHATE-BONDED BASIC REFRACTORY
COMPOSITION
Walter S. Treffner, Linthicum Heights, and Alfred H. Foessel, Baltimore, Md., assignors to General Refractories Company, Philadelphia, Pa., a corporation of Pennsylvania
No Drawing. Filed July 26, 1967, Ser. No. 656,035
Int. Cl. C04b 35/04, 35/42
U.S. Cl. 106—58                    15 Claims

ABSTRACT OF THE DISCLOSURE

Dead burned low silica magnesite, a sodium polyphosphate and a calcium compound are mixed in proportions to provide selected predetermined relationships in the ratios—$CaO:SiO_2$; $P_2O_5:SiO_2$; $P_2O_5:CaO$ and $CaO:(P_2O_5+SiO_2)$ resulting in a basic refractory composition of high strength at 2300° F. and at 2700° F. In another embodiment, low silica chrome ore is also included in the composition and the proportions of the materials are controlled to provide a high $CaO:SiO_2$ ratio.

It is common practice in making basic, magnesia-containing refractory compositions to use them in the unburned state. Eventually, in use, the compositions may become subjected to temperatures at which a ceramic bond is achieved by sintering of the particles. The strength of the compositions before achieving the ceramic bond is provided by a "chemical" bond formed by the addition of a material which reacts with the magnesia portion of the composition at low to moderate temperatures. Materials like sulfates (e.g. magnesium sulfate, acid sulfates and sulfuric acid); chromates (e.g. chromium salts and chromic acid); silicates (e.g. alkali silicates); chlorides and hydraulic cements, have been so used as chemical binders. A disadvantage of most of these chemical bonding agents is that they, or their reaction products, decompose at elevated temperatures where strength development through ceramic bonding has not been sufficiently advanced. Thus, as the composition reaches temperatures in the neighborhood of 2000–2300° F. there is a marked decrease in strength. Chromate bonds may retain their bonding power at such temperatures, but lose their strength rapidly at small increases in temperature, say to 2700° F., thus often also inhibiting adequate ceramic bond development. The low "intermediate" bending strength of chemically bonded refractory compositions has been considered as one of the reasons for premature failure of such compositions.

More recently it has been found that sodium polyphosphates provide improved hot strength in magnesia basic refractory compositions [Lyon et al., "Phosphate Bonding of Magnesia Refractories," Ceramic Bulletin, vol. 45, No. 12 (1966); Limes et al., "Improved Chemical Bonds for Basic Aggregate," presented at 67th Annual Meeting, The American Ceramic Society, Philadelphia, May 3, 1965, abstract in Am. Ceram. Soc. Bull., 44 (4) 359 (1965); and U.S. Pat. Nos. 3,304,186 and 3,304,187]. These report hot strengths (modulus of rupture) as high as 1350 p.s.i. at 2300° F., in unfired bricks, and 2025 p.s.i., on bricks fired at 2640° F., in compositions, however, where dicalcium silicate had been included in the magnesia grains. Using only dead burned magnesia alone or mixed with chrome ore, the reported hot strengths at 2300° F., for unfired compositions were low, the best appearing to be 530 p.s.i.

It is the principal object of the present invention to provide a chemically-bonded, basic, magnesia-containing refractory composition having, in the unfired condition, improved hot strength.

It is another object of the present invention to provide a novel, chemically-bonded, basic, magnesia-containing refractory composition having, in the unfired condition, improved strength at 2300° F.

It is a further object of the present invention to provide a composition of the type described which, in the unfired state, has improved strength at 2700° F. as well as 2300° F.

Still another object of the invention is to provide a composition of the type described also having marked toughness under high temperature compressive stresses, very good slag resistance against basic slags and high thermal shock resistance.

Other objects will become apparent from a consideration of the following specification and claims.

It has been found that unexpectedly high strength at 2300° F., and improved strengths even at 2700° F., can be obtained in unfired, basic magnesia-containing, refractory compositions when the compositions are prepared from materials selected and proportioned to provide relationships among the CaO; $SiO_2$ and $P_2O_5$ contents within certain ranges and wherein the total content of $SiO_2$ in the composition is low.

Thus, in accordance with one main embodiment of the present invention the composition consists essentially of:

(a) calcined magnesite having a silica content below 0.7%;
(b) a calcium compound, and
(c) a sodium polyphosphate having the formula

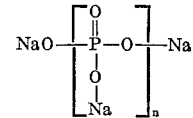

where $n$ is an integer from 4 to 100; said composition having an $SiO_2$ content below 0.7%; a $CaO:SiO_2$ ratio of at least about 4.5:1; a $P_2O_5:SiO_2$ ratio of from 3:1 to 12:1; a $P_2O_5:CaO$ ratio of from 0.6:1 to 1.2:1, and a $CaO:(P_2O_5+SiO_2)$ ratio of from 0.8:1 to 1.3:1. In the preferred compositions according to the invention, the $SiO_2$ content is below 0.5%, and the value for $n$ is from about 10 to about 30.

As will appear from the data set forth hereinafter, compositions prepared according to the broader aspects of the invention, in the unfired state, have strengths at 2300° F. of about 2000 p.s.i. or higher and have strengths at 2700° F. of well over 200 p.s.i.; and preferred compositions have, in the unfired state, strengths at 2300° F. well over 2000 p.s.i.—sometimes even approaching or exceeding 3000 p.s.i., and strengths at 2700° F. sometimes even approaching or exceeding 2000 p.s.i.

Referring to the magnesia source employed in accordance with the present invention, it will, as stated, be a calcined magnesite of low silica content, that is having a silica content below 0.7%. Otherwise, the calcined magnesite need not be of high purity as regards MgO content, and a typical calcined magnesite found to be particularly suitable in accordance with the present invention has the following average analysis:

|  | Percent |
|---|---|
| MgO | 91–92 |
| SiO$_2$ | .3 |
| CaO | 2.7 |
| Oxides of Fe, Al, Mn, etc. | 5 |

The initial magnesite, as stated, will be calcined to convert the magnesium carbonate to magnesium oxide. Thus, the magnesite may be, and preferably is, dead-burned which is usually affected by calcining at temperatures above about 2700° F.

The calcined magnesite is the principal aggregate of the present composition and, as is well known and conventional in compositions of this type, the particle size—and particle size distribution—thereof may vary depending in part at least upon the particular mode in which the composition is to be used. Generally, it is desirable to have a combination of relatively coarse particles, and relatively fine particles, as from about 20 to about 90%, by weight, of coarse particles and the balance (from about 80 to about 10%) of fine particles. Coarse fractions generally have a particle size of —2 +48 mesh, and the fine fraction is somewhat finer than the coarse particles and is generally —28 mesh, and preferably —48 mesh. A typical grain sizing particularly suitable for gunning, ramming, casting and brick-making operations is about 60% —6 +35 mesh and about 40% —48 mesh. Mesh sizes herein refer to Tyler mesh series.

The principal chemical binder employed according to the present invention is a sodium polyphosphate having the formula:

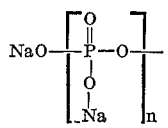

where $n$ is from 4 to 100. These are amorphous glasses, and are available in powder form. The $n$ actually represents an average chain length. In the preferred sodium polyphosphates, $n$ is from about 10 to about 30. Such sodium polyphosphates are essentially neutral to alkaline, that is they will have a pH in water of 6.5 and higher. An especially advantageous sodium polyphosphate is one in which $n$ is about 21.

There is also included in the compositions of the present invention a calcium compound. This calcium compound serves to adjust the CaO:SiO$_2$ ratio of the composition to within the desired range should such adjustment be necessary. However, it has an important function over and beyond this in that, even when the calcined magnesite by itself has the proper CaO:SiO$_2$ ratio, the addition of the calcium compound markedly enhances the bond strength particularly at 2700° F. Thus, it is believed that the calcuim compound acts essentially as a promoter for bonding reactions taking place at temperatures in the neighborhood of 2700° F. Thus it is believed that the calcium compound decomposes at intermediate temperatures, such as in the range of about 1600 to about 2000° F., depending upon the particular calcium compound, reacting with the sodium polyphosphate. The resulting complex calcium-sodium phosphate is believed to be the major bond at temperatures of about 1800–2700° F., and tricalcium phosphate is believed to be the major bonding constituent at higher temperatures. Suitable calcium compounds are calcium carbonate and hydraulic cements, like calcium aluminate cement and portland cement. The hydraulic cements, especially calcium aluminate cement, are preferred. These form the best initial bond at temperatures from room temperature to about 1800° F. as well as their good bond-forming capability at temperatures above 1800° F.

The relative proportions of the three stated components are selected to provide a relationship among the CaO, SiO$_2$ and P$_2$O$_5$ within certain ratio ranges. Thus, the CaO:SiO$_2$ ratio must be at least 4.5:1. While there appears to be no critical upper limit to this ratio, particularly when the SiO$_2$ content is very low, in practice it generally does not exceed about 20:1. The P$_2$O$_5$:SiO$_2$ ratio for the present compositions will also be relatively high, that is from 3:1 to 12:1. The P$_2$O$_5$:CaO ratio will be, as stated, from 0.6:1 to 1.2:1; and the CaO:(P$_2$O$_5$+SiO$_2$) ratio is from 0.8:1 to 1.3:1. These ratios are on a weight basis.

It will be seen that the actual amounts of sodium polyphosphate and of calcium compound employed may vary somewhat and be adjusted depending upon the particular relationships, within the foregoing ranges, which are desired, and upon the physical-chemical nature of the particular magnesite and calcium compound used. In any case, neither the sodium polyphosphate nor the added calcium compound generally exceeds about 10%, by weight, based on the weight of the dry composition, and each may be present in an amount from about 1 to about 8%, preferably from about 2 to about 8%, by weight, based on the weight of the composition.

In preparing the composition, the stated materials are simply mixed in accordance with well known and conventional practice and techniques. The dry mix may be marketed as such. In use, water is added, usually in an amount from about 1 to about 30%, by weight, based on the weight of the dry mix, to provide a plastic mass of the consistency desired for the particular mode of use.

The water-containing, plastic mass may be pressed into bricks, or it may be cast into shapes or gunned, rammed, shovelled, or the like, into place. In one or another of such forms the composition may be used where basic refractory compositions are normally used as in basic oxygen- and open hearth steel-making furnaces.

The compositions of the present invention may also have pitch incorporated therein. For example, finely-divided high melting pitch may be added to and blended into the above-described mix. Preformed brick, fired or unfired, may be impregnated with molten pitch. The amount of pitch so included may range from about 2 to about 8%, by weight, based on the combined dry weight of calcined magnesite, sodium polyphosphate and calcium compound.

The following Examples 1–14 illustrate the embodiment described above in which the refractory aggregate consists essentially of the calcined magnesite.

EXAMPLES 1–15

In these examples, there is employed a dead-burned Austrian magnesite having the average oxide analysis:

|  | Percent |
|---|---|
| MgO | 91–92 |
| SiO$_2$ | .3 |
| CaO | 2.7 |
| Oxides of Fe, Al, Mn, etc. | 5 |

Its grain sizing is 60% —6 +35 mesh and 40% —48 mesh. It is mixed with various sodium polyphosphates and various calcium compounds (no calcium compound is employed in Example 15), as set forth in the following table, in various amounts as also set forth in the table. The sodium polyphosphate and calcium compound are powders. After the materials are mixed dry, water in an amount of 2%, by weight, based on the weight of the dry mix is added to temper. Bricks 9″ x 4½″ x 2½″ are then pressed at 12,000 p.s.i., and the bricks are dried at 300° F. for 24 hours. From these dried bricks are cut bars 6″ x 1″ x 1″. A portion of the bars (three for each example) is heated to 2300° F. in 5 hours and held at this temperature for 15 hours and the modulus of rupture (MOR) at that temperature is measured. Another portion of the bars (three for each example) is heated to 2700° F. over five hours and held at that temperature for 15 hours. The MOR of these bars at 2700° F. is also measured. The MOR determinations for each three samples are averaged.

The examples and results are summarized in the following Table I:

With regard to the relationships among the principal ingredients, it appears that the controlling factor, particularly as the proportion of chrome ore increases, is the $CaO:SiO_2$ ratio. This is controlled as described above; namely at least 4.5:1 and preferably from 6:1 to 10:1.

The following Examples 16–18 are given to illustrate this embodiment of the invention:

TABLE I

| Example No. | 1 | 2 | 3 | 4 | 5 | 6 | 7 | 8 |
|---|---|---|---|---|---|---|---|---|
| Calcined Magnesite | [1]100 | 100 | 100 | 100 | 100 | 100 | 100 | 100 |
| Na Polyphosphate: | | | | | | | | |
| $n=6$ | | | | | | | | |
| $n=21$ | [1]4 | 4 | 4 | 5 | 5 | 5 | 5 | 6 |
| Calcium Aluminate Cement | [1]2 | 3 | 4 | 2 | 3 | 4 | 5 | 2 |
| Portland Cement | | | | | | | | |
| $CaCO_3$ | | | | | | | | |
| MOR at 2,300° F., p.s.i. | 2,885 | 2,154 | 1,931 | 2,977 | 3,671 | 2,962 | 2,649 | 1,649 |
| MOR at 2,700° F., p.s.i. | 1,323 | 375 | 256 | 1,678 | 2,321 | 877 | 330 | 332 |
| $CaO:SiO_2$ | 9.0:1 | 8.7:1 | 8.3:1 | 9.0:1 | 8.7:1 | 8.3:1 | 8.0:1 | 9.0:1 |
| $P_2O_5:SiO_2$ | 7:1 | 6.1:1 | 5.4:1 | 8.8:1 | 7.6:1 | 7.3:1 | 6:1 | 10.6:1 |
| $P_2O_5:CaO$ | .78:1 | 0.7:1 | 0.65:1 | 0.98:1 | 0.87:1 | 0.81:1 | 0.74:1 | 1.16:1 |
| $CaO:(P_2O_5+SiO_2)$ | 1.12:1 | 1.23:1 | 1.3:1 | 0.94:1 | 1.01:1 | 1.08:1 | 1.15:1 | 0.78:1 |

| Example No. | 9 | 10 | 11 | 12 | 13 | 14 | 15 |
|---|---|---|---|---|---|---|---|
| Calcined Magnesite | 100 | 100 | 100 | 100 | 100 | 100 | 100 |
| Na Polyphosphate: | | | | | | | |
| $n=6$ | | | | | | 5 | |
| $n=21$ | 6 | 6 | 6 | 5 | 5 | | 5 |
| Calcium Aluminate cement [2] | 3 | 4 | 5 | | | 3 | |
| Portland Cement | | | | | 3 | | |
| $CaCO_3$ | | | | 3 | | | |
| MOR at 2,300° F., p.s.i. | 2,338 | 2,742 | 2,644 | 2,590 | 2,930 | 3,420 | 2,090 |
| MOR at 2,700° F., p.s.i. | 378 | 954 | 1,643 | 1,600 | 2,570 | 2,070 | 306 |
| $CaO:SiO_2$ | 8.7:1 | 8.3:1 | 8.0:1 | 15.6:1 | 4.6:1 | 8.3:1 | 9.6:1 |
| $P_2O_5:SiO_2$ | 9.1:1 | 8:1 | 7.2:1 | 12:1 | 3.3:1 | 7.3:1 | 11.9:1 |
| $P_2O_5:CaO$ | 1.05:1 | 0.97:1 | 0.89:1 | .77:1 | .71:1 | .87:1 | 1.24:1 |
| $CaO:(P_2O_5+SiO_2)$ | 0.86:1 | 0.92:1 | 0.98:1 | 1.2:1 | 1.1:1 | 1.0:1 | 0.74:1 |

[1] In top five horizontal columns, the figures represent parts by weight.
[2] Averaging about 38% CaO, 46% $Al_2O_3$ and 6% $SiO_2$.

Examples 1, 4–6, 10, 11 and 14 illustrate a preferred embodiment of the invention wherein, with the particular magnesite employed and calcium aluminate cement, the ratio ranges are as follows—$CaO:SiO_2$, 8:1 to 9:1; $P_2O_5:SiO_2$, 7:1 to 9:1; $P_2O_5:CaO$, 0.75:1 to 1:1, and $CaO:(P_2O_5+SiO_2)$, 0.9:1 to 1.15:1. With other specific magnesites and other calcium compounds, other preferred ranges, within the general ranges hereinabove set forth, can readily be determined.

In another embodiment of the invention, low silica chrome ore is included with the calcined magnesite to form the principal aggregate, and this may be in the form of a simple mixture of the two or as a pre-sintered grain formed by sintering the mixture, usually as a preformed body, followed by crushing and grinding. In any event the chrome ore may range up to about 40%, by weight, of the mixture thereof and the calcined magnesite. The chrome ore, as stated, will be of a low-silica variety; that is to say, it will contain no more than about 1.5% of silica. However, since it will add silica to the composition the maximum amount of $SiO_2$ in the composition may come near to 1%.

Thus, the composition of this embodiment of the invention consists essentially of:

(a) calcined magnesite having a silica content below 0.7%;
(b) a calcium compound;
(c) a sodium polyphosphate as defined above, and
(d) low silica chrome ore in an amount not over about 40%, by weight, based on the combined weight of it and the calcined magnesite.

Except for the maximum $SiO_2$ content, and the fact that the above described $P_2O_5:SiO_2$; $P_2O_5:CaO$ and $CaO:(P_2O_5+SiO_2)$ ratio ranges may not apply, what has been said above concerning preparation of the composition, particle sizes, sodium polyphosphate, added calcium compound, inclusion of pitch, and so on applies to this embodiment.

EXAMPLES 16–18

In these examples, the calcined magnesite is the same as used in Examples 1–15, the sodium polyphosphate and calcium aluminate cement are the same as used in Examples 1–11, and the products are prepared and tested as in Examples 1–15. The chrome ore is washed Transvaal concentrates, −28 mesh, having the average analysis:

| | Percent |
|---|---|
| $SiO_2$ | 1.2 |
| $Fe_2O_3$ | 25.4 |
| $Al_2O_3$ | 16.2 |
| $CaO$ | 0.6 |
| $MgO$ | 10.5 |
| $Cr_2O_3$ | 46.1 |

The materials, proportions (in parts by weight) and results may be summarized as follows:

TABLE II

| Example No. | 16 | 17 | 18 |
|---|---|---|---|
| Calcined magnesite | 80 | 70 | 60 |
| Chrome ore | 20 | 30 | 40 |
| Na polyphosphate | 5 | 5 | 5 |
| Calcium aluminate cement | 3 | 3 | 3 |
| $CaCO_3$ | 3 | 3 | 4 |
| MOR at 2,300° F., p.s.i. | 2,210 | 2,350 | 1,720 |
| MOR at 2,700° F., p.s.i. | 1,660 | 1,840 | 1,960 |
| $CaO:SiO_2$ | 8.1:1 | 6.5:1 | 6.4:1 |

EXAMPLES 19–20

In these examples, the calcined magnesite used has the analysis:

| | Percent |
|---|---|
| MgO | 88–89 |
| $SiO_2$ | 0.4 |
| CaO | 5.0 |
| Oxides of Fe, Al, Mn, etc. | 5.5 |

The sodium polyphosphate and calcium aluminate cement are as used in Examples 1–11. Otherwise the procedure is as used in Examples 1–15. The materials, propor- 3,522,063 tions (in parts by weight) and results are summarized in the following Table III:

TABLE III

| Example No. | 19 | 20 |
|---|---|---|
| Calcined magnesite | 100 | 100 |
| Na polyphosphate | 5 | 7.25 |
| Calcium aluminate cement | 3 | |
| Portland cement | | 1.5 |
| MOR at 2,300° F., p.s.i | 2,690 | 3,460 |
| MOR at 2,700° F., p.s.i | 140 | 3,490 |
| CaO:SiO$_2$ | 11.9 | 8.5 |
| P$_2$O$_5$:SiO$_2$ | 6.8 | 7.3 |
| P$_2$O$_5$:CaO | 0.57 | 0.85 |
| CaO:(P$_2$O$_5$+SiO$_2$) | 1.52 | 1.03 |

Some modification is possible in the selection of particular materials employed as well as in amounts thereof, and in the inclusion of additives which do not deleteriously alter the advantageous characteristics of the present composition in a material way, without departing from the scope of the present invention.

What is claimed is:

1. A basic, magnesia-containing refractory composition of improved hot strength consisting essentially of:
   (a) calcined magnesite having a silica content below 0.7;
   (b) a calcium compound selected from the group consisting of calcium carbonate and a hydraulic cement; and
   (c) a sodium polyphosphate having the formula:

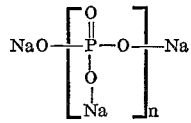

where N is an integer from 4 to 100, said composition having a SiO$_2$ content below 0.7%; a CaO:SiO$_2$ ratio of at least about 4.5:1, a P$_2$O$_5$:SiO$_2$ ratio of from 3:1 to 12:1; a P$_2$O$_5$:CaO ratio of from 0.6:1 to 1.2:1, and a CaO:(P$_2$O$_5$+SiO$_2$) ratio of from 0.8:1 to 1.3:1, said calcium compound and said sodium polyphosphate each being present in an amount of from about 1% to about 10%, by weight, based on the weight of the composition.

2. The composition of claim 1 wherein $n$ is an integer from about 10 to about 30.

3. The composition of claim 1 wherein the SiO$_2$ content is below 0.5%.

4. The composition of claim 3 wherein $n$ is an integer from about 10 to about 30.

5. The composition of claim 1 wherein the calcium compound is calcium aluminate cement.

6. The composition of claim 1 containing also pitch.

7. The composition of claim 1 in brick form.

8. The brick of claim 7 impregnated with pitch.

9. The composition of claim 5 wherein said calcined magnesite has a MgO content of 91–92%; wherein the silica content is below 0.5%; wherein $n$ is an integer from about 10 to about 30; wherein the CaO:SiO$_2$ ratio is from 8:1 to 9:1; wherein the P$_2$O$_5$:SiO$_2$ ratio is from 7:1 to 9:1; wherein the P$_2$O$_5$:CaO ratio is from 0.75:1 to 1:1, and wherein the CaO:(P$_2$O$_5$+SiO$_2$) ratio is from 0.9:1 to 1.15:1.

10. A basic, magnesia-containing refractory composition of improved hot strength consisting essentially of:
   (a) calcined magnesite having a silica content below 0.7;
   (b) a calcium compound selected from the group consisting of calcium carbonate and a hydraulic cement;
   (c) a sodium polyphosphate having the formula:

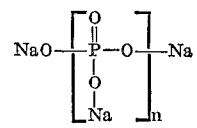

where $n$ is an integer from 4 to 100, and (d) low silica chrome ore in an amount up to 40%, by weight, thereof based on the combined weight thereof with said calcined magnesite, said composition having a SiO$_2$ content below 1%, and having a CaO:SiO$_2$ ratio of at least about 4.5:1, said calcium compound and said sodium polyphosphate each being present in an amount of from about 1% to about 10%, by weight, based on the weight of the composition.

11. The composition of claim 10 wherein $n$ is an integer from about 10 to about 30.

12. The composition of claim 10 wherein the SiO$_2$ content is below 0.7%, and wherein the CaO:SiO$_2$ ratio is from 6:1 to 10:1.

13. The composition of claim 10 wherein said calcium compound is calcium aluminate cement.

14. The method of making a basic, magnesia-containing refractory composition of improved hot strength which comprises mixing:
   (a) calcined magnesite having a silica content below 0.7%;
   (b) a calcium compound selected from the group consisting of calcium carbonate and a hydraulic cement; and
   (c) a sodium polyphosphate having the formula:

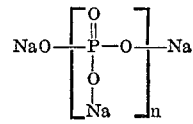

where $n$ is an integer from 4 to 100, in proportions to provide, in the resulting mixture, a SiO$_2$ content below 0.7%, a CaO:SiO$_2$ ratio of at least about 4.5:1, a P$_2$O$_5$:SiO$_2$ ratio of from about 3:1 to about 12:1, a P$_2$O$_5$:CaO ratio of from about 0.6:1 to about 1.2:1, and a CaO:(P$_2$O$_5$+SiO$_2$) ratio of from about 0.8:1 to about 1.3:1, said calcium compound and said sodium polyphosphate each being present in an amount of from about 1% to about 10%, by weight, based on the weight of the composition.

15. The method of making a basic magnesia-containing refractory composition of improved hot strength which comprises mixing:
   (a) calcined magnesite having a silica content below 0.7;
   (b) a calcium compound selected from the group consisting of calcium carbonate and a hydraulic cement;
   (c) a sodium polyphosphate having the formula:

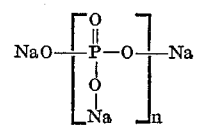

where $n$ is an integer from 4 to 100; and
   (d) low silica chrome ore in an amount up to 40%, by weight, thereof based on the combined weight thereof with said calcined magnesite, in proportions to provide, in said mixture, a SiO$_2$ content below 1% and a CaO:SiO$_2$ ratio of at least about 4.5:1, said calcium compound and said sodium polyphosphate each being present in an amount of from about 1% to about 10%, by weight, based on the weight of the composition.

References Cited

UNITED STATES PATENTS 3,304,186    2/1967    Limes et al.     106—58
3,304,187    2/1967    Limes et al.     106—58

JAMES E. POER, Primary Examiner

U.S. Cl. X.R.

106—59, 63, 64